WIDE-OPEN HIGH RESOLUTION RECEIVER

Filed March 18, 1966 2 Sheets-Sheet 1

INVENTOR
JULIAN CABALLERO, Jr.
BY Hurwitz & Rose
ATTORNEYS

INVENTOR
JULIAN CABALLERO, Jr.

BY Hurvitz & Rose

ATTORNEYS

United States Patent Office 3,488,594

Patented Jan. 6, 1970

3,488,594
WIDE-OPEN HIGH RESOLUTION RECEIVER

Julian Caballero, Jr., Fairfax, Va., assignor to Melpar, Inc., Falls Church, Va., a corporation of Delaware Filed Mar. 18, 1966, Ser. No. 535,573
Int. Cl. H04b 1/36
U.S. Cl. 325—332 13 Claims

ABSTRACT OF THE DISCLOSURE

A wideband receiver for concurrently monitoring a plurality of contiguous channels within the R-F spectrum to detect a signal in any one or more of them, includes a plurality of transmission paths arranged for parallel receipt of incoming signals in the overall band of interest. The number of these transmission paths is selected to coincide with the number of positions of a digital mixed base code chosen to identify the respective channels being monitored. In particular, each channel is to be identified by a distinct and different digital word (number) of the mixed base code. Each transmission path contains a bandpass filter, a broadband discriminator to produce phase shift of applied signal as a a function of its frequency, and a cathode ray tube whose face is divided into wedge shaped segments. The segments are equal in number to the digits that may occupy the particular position of the code represented by the respective transmission path, and are respectively designated by those digits. Voltages are derived from signal amplitude and frequency for application to the CRT's to deflect the respective beam of the CRT to a radial distance and through an angle, respectively, for incidence on one of the segments. The collective segments so identified, according to respective code positions, designate the channel in which the incoming signal is located.

The present invention relates generally to R-F receivers, and, more particularly, to wide-open high-resolution receivers utilizing mixed-based coding techniques.

It is often necessary, in the pursuit of electronic intelligence and electronic counter measure (ECM) activities, to detect signals which may occur anywhere within a wide range of the R-F spectrum. In the past a wide variety of approaches have been taken to solve this detection problem, the two most common approaches being: (1) the use of a large number of fixed-tuned contiguous bandwidth receivers, each having a bandwidth commensurate with the required frequency resolution or selectivity, and (2) the use of variable-tuned receivers, much fewer in number than that required in (1), above, each receiver capable of being tuned over the entire band with the required selectivity.

Many applications require that the frequency resolution of the receiver system be high; hence, the fixed-tuned contiguous receiver approach, sometimes referred to as a channelized receiver, generally requires only the use of a large number of receiver channels. It will be observed, therefore, that this technique of signal detection involves a need for at least a corresponding number of local oscillators, heterodyne mixers, and channel filters, resulting in a complex, costly, and bulky receiver system.

On the other hand, the variable tuning approach, while circumventing some of the disadvantages of the channelized receiver technique, introduces several disadvantages of its own; primarily in that it sacrifices intercept probability, and is at a particular disadvantaage when attempting to detect and analyze frequency-agile signals.

Accordingly, it is a principal object of the present invention to provide new and improved receivers for use in the detection of signals occurring anywhere within a wide range of the R-F spectrum.

Another object of the invention is to overcome various disadvantages of prior art receivers of the aforementioned type.

From the considerations which have thus far been mentioned it will be observed that achievement of the wide-open characteristics of channelized receivers, without attendant penalties of size, weight, cost, and complexity owing to the large number of receivers normally required in such an approach, is an extremely desirable objective. To some extent, spectrum-folding and wideband discriminator techniques have had a measure of success in the attempted attainment of this goal. In the spectrum-folding or multispectrum schemes, multiple heterodyning is employed to permit several portions of the basic R-F spectrum to pass through a single receiver channel. Where high resolution is required, additional economy may be achieved by properly coding the characteristics of the multispectrum receiver channels. In the past few years several multispectrum ECM receivers have been employed using mixed-base coding techniques of the type disclosed in U.S. Patent No. 3,132,334, granted May 5, 1964, to Richard E. Williams, and commonly assigned herewith.

It is a further object of the present invention to provide an improved wide-open high resolution receiver employing mixed-based coding techniques.

Another object of the invention resides in the provision of a wideband high-resolution receiver for simultaneously monitoring a plurality of continuous frequency channels within a preselected band of the R-F spectrum, and employing a mixed-base coding scheme which allows the replacement of conventional R-F filters and associated apparatus by a substantially smaller number of geometrical filters capable of covering the same frequency band.

In order to provide the basis for a clear understanding of the present invention it is helpful at this point to briefly discuss the mixed-base code notation and its relationship to more conventional number systems. The discussion will include basic principles of a simple mixed-based code and of a staggered mixed-base code suitable for use in the apparatus according to the invention.

A variety of different number systems have been employed for coding purposes, the most common being those number systems utilizing a common base. Each digital word is written or coded in shorthand notation as a series of digits $a_n a_{n-1} a_{n-2} \ldots a_0$ where the $a$'s are coefficients of successive powers (from right to left) of an integer termed the base or radix. Thus the positional notation of common base number systems is merely an arrangement wherein each position or column is weighted according to successive powers of the base, and therefore constitutes an abbreviated version of the more complete expression $$\Sigma k^{a} k^{r^{k}}$$

where $r$ is the base (radix) and $0 \leq a_k \leq r-1$. In the decimal system, for example, $r=10$ so that the coefficients $a_k$ (digits forming a word in the positional notation extend from 0 through 9. Similarly, binary numbers (words) are based on $r=2$, with $a_k$ taking on the values 0 and 1; octal words on $r=8$, $0\leq a_k\leq 7$; and so forth.

Because of the columnar or positional weighting in the positional notation of common base words, computations involving such words generally require carry operations, i.e. transfer of digits from one column to another.

The mixed-base notation, employed in the present invention, on the other hand, refers to a coding scheme or digital format wherein the digits in each column or position are referenced to a different base, with no positional weighting. The scheme is, in fact, based on the use of different moduli *m* for each position so that the digit in each column is actually the remainder deriving from the division of a real integer by an integral multiple of the modulo $m_k$ for that column or position. In a 3–4–5 mixed-base code, for example, the positional notation is based on modulo, 3, modulo 4, modulo 5, so that the word "15" in decimal notation is designated "030" in 3–4–5 mixed-base notation. It will readily be observed that this result is a consequence of the fact that 15 is an integral multiple of 3, viz 15/3=5 remainder 0, and, similarly, 15/4=3 remainder 3, 15/5=remainder 0. It will also be apparent that digits in each column or position can take on only the values $0\leq b_k\leq m_k-1$, where $b_k$ is the digit in the position *k* based on modulo $m_k$.

Because of the absence of positional weighting, the digits in each column simply recycle in value as the number represented increases. The addition of "unity" to the decimal number 32, for example, results in a cyclic increase in only one position, viz. the increase in value of the digit in the second position from "2" to "3." In the conventional binary notation, decimal number "32" is represented by "100000," and "33" by "100001," again less than a complete cyclic increase in all positions. The decimal notation change from "32" to "33," an addition of "unity" to the former, is indicated in the 3–4–5 mixed-base notation as a change from "202" to "013," an addition of "unity" to *each* column. It will be apparent, therefore, that a simple mixed-base code is limited to a series of nonredundant digital words over a range of values equal to the lowest common denominator of the moduli. In the case of the 3–4–5 mixed-base notation, $3\times 4\times 5=60$ (the lowest common denominator of 3, 4, and 5) so that decimal numbers 0 through 59 inclusive, for example, may be expressed without ambiguity. Of course, the non-redundant word capacity of a mixed-base code increases as the number of moduli increases or as the value of the integer representing each modulo increases. For the sake of clarity and simplicity, an embodiment of the present invention will be described in connection with the use of a 3–4–5 mixed-base code, but it will be understood that this is not to be taken as a limitation on the scope or breadth of the invention, and that other mixed base moduli and/or a larger number of moduli may be employed in the mixed-base code, if desired.

Detailed discussion of the mixed-base notation is available in the prior art (see, e.g. U.S. Patent 3,019,975 to R. E. Williams, commonly assigned herewith), so that the presentation here has been relatively brief, confined to very basic principles of the code. It is convenient for purposes of the present invention, to depart slightly from the usual mixed-base notation by allowing the digits $b_k$ in each position *k* to take on the values $1\leq b_k\leq m_k$. In other words, a digit in the position based on modulo 3 may have a value of either 1, 2, or 3, corresponding to the normal values 0, 1, or 2, respectively with similar considerations applying to digits in positions based on the remaining moduli of the code. Here again, this is purely a matter of convenience, rather than a limitation of the inventive principles. This code scheme, utilized in a 3–4–5 mixed-base notation, is presented for the partial range of non-redundancy covering the 16 digits in decimal notation from 0 through 15, in the following table.

TABLE A

| | 3-4-5 Mixed-Base Notation | | |
|---|---|---|---|
| | Modulo 3 | Modulo 4 | Modulo 5 |
| Decimal Notation: | | | |
| 0 | 1 | 1 | 1 |
| 1 | 2 | 2 | 2 |
| 2 | 3 | 3 | 3 |
| 3 | 1 | 4 | 4 |
| 4 | 2 | 1 | 5 |
| 5 | 3 | 2 | 1 |
| 6 | 1 | 3 | 2 |
| 7 | 2 | 4 | 3 |
| 8 | 3 | 1 | 4 |
| 9 | 1 | 2 | 5 |
| 10 | 2 | 3 | 1 |
| 11 | 3 | 4 | 2 |
| 12 | 1 | 1 | 3 |
| 13 | 2 | 2 | 4 |
| 14 | 3 | 3 | 5 |
| 15 | 1 | 4 | 1 |

Of course, as previously stated, a range of any 60 consecutive digital words in decimal notation may be represented without ambiguity in the 3–4–5 mixed-base code, so that Table A could be extended to cover decimal numbers 0–59 before the code begins to repeat.

It is also convenient to utilize a staggered mixed-base code, which is merely a variation of a simple mixed-base code of the type briefly discussed above. The staggered code, and the purpose which it serves will be discussed presently.

The development of wideband microwave receivers may be accomplished in a manner representing a practical application of the mixed-base coding concept. For example, a receiver may be designed with one channel for each column (position) in the mixed-base code, the number of parallel outputs from each channel corresponding to the numerical value of the base (modulo integer) of each column. The receiver may be designed in such a manner that, as the frequency of the received signal varies from one end of the band to the other, the output of each channel cycles in accordance with the mixed-base code. For a 3–4–5 mixed-base code, the receiver would consist of three channels having a total of twelve output leads (i.e., 3+4+5=12). The outputs from each channel could be derived from the respective outputs of narrowband I-F filters, each channel thereby requiring a number of filters equal to the numerical value of the base of the mixed-base code column to which that channel corresponds. Thus, for the 3–4–5 code, the first channel would require three filters, the second channel four filters, and the third channel five filters. By using, a comb of harmonically related signals as the local oscillators for each channel, the outputs of the filters will cycle in the required manner. In this fashion, receiver resolution equivalent to 60 narrowband channels, or frequency cells, can be obtained by use of only 12 filters and 3 harmonic generators. The AN/SLQ–7 and AN/ULR–12 ECM receivers are typical of equipments using this technique.

It is a more specific object of the present invention to provide a wideband high-resolution receiver employing geometrical filtering in accordance with mixed-base coding to eliminate the need for conventional R-F filters, mixers and harmonic generators.

Briefly, according to one embodiment of the present invention there is provided a plurality of parallel transmission paths in a wideband receiver, the number of transmission paths corresponding to the number of positions in the mixed-base code employed. Each transmission path comprises a geometrical filter including a broadband discriminator responsive to signal applied to its respective transmission path to derive therefrom quadrature voltages which vary proportionally to the signal frequency. Each broadband discriminator effectively shifts the phase of its input signal by a different amount so that when the respective quadrature voltages are applied to the horizontal and vertical deflection plates of a cathode-ray tube forming a further portion of the geometrical filter, the angular deflection of the electron beam of the tube, representative of signal frequency, describes a circular pattern on the face of the tube and undergoes a 360° revolution for a frequency change differing from the frequency change required for a similar revolution by the beams of the other tubes (i.e., the cathode-ray tubes in each of the other filters). By assigning each transmission path, and thereby each geometrical filter, a distinct and different position of the code, the face of each CRT may be divided into segments each corresponding to a digit in the set of digital values capable of being assumed by that code position as governed by the base for that position. Similarly, each segment may be associated with a narrow frequency band lying within the R-F bandwidth to be monitored but having a bandwidth greater than that of each of the identical contiguous frequency channels sought to be observed. The bandwidth of each frequency channel, and hence the number of channels within the monitored R-F band, will depend upon the desired resolution of the receiver and will thereby govern the specific bases and the number of positions of the mixed-base code employed. If each segment of each CRT is associated with a different narrow frequency band, but an identical bandwidth, so that the frequency bands are displaced relative to one another in the several transmissions paths by a frequency range corresponding to the bandwidth of each of the contiguous frequency channels under observation, then the quadrature voltages supplied by the broadband discriminators to the respective CRT's will result in beam deflections (and beam incidences upon segments) designating a mixed-base code notation representing a distinct one of the frequency chanels within which the received signal lies at a given instant of time, even though each segment represents successive narrow frequency bands displaced by the frequency range covered by remaining segments of the same tube so that the digital value assumed by any one code position is redundant as to which of the channels carries the received signal. In effect, the geometrical filter operates as an analog-to-digital converter producing a digital output representative of a frequency band (which may be as narrow as desired, i.e. infinite resolution and sensitivity, by proper code selection) within which the frequency of an analog input signal lies.

The circumference of the circle described by the electron beam on the face of the CRT is a function of frequency. To prevent distortion and inaccuracies in the readout it is necessary that the electron beam trace out identical arcs or circles for input signal of the same frequency each time such a signal is received. To this end, a circle representative of a predetermined band of frequencies within the bandwidth or spectrum covered by each geometrical filter is selected at which the CRT is to operate. Input signal to the discriminator is restricted to this preselected band by the provision of a bandpass filter, having the selected band, in advance of the discriminator in each transmission path. The signal applied to the bandpass filter is derived by mixing the input signal to the transmission path under consideration with the output of a local oscillator, the latter comprising a harmonic generator having harmonics spaced at exactly the bandwidth of the bandpass filter. In this manner, the signal fed to the discriminator will at all times fall within the preselected band for the circle at which the geometrical filter is to operate for all frequencies lying in the overall band associated with that filter. In other words, the provision of the local oscillator and bandpass filter insures that the electron beam "spot" travels the same distance for each input signal of the same frequency, and that a sharp distinction is maintained between the bandwidths covered by each segment of the CRT, with attendant high resolution and accuracy of readout.

The above and still further objects, features and advantages of the present invention will become apparent upon consideration of the following detailed description of one specific embodiment thereof, especially when taken in conjunction with the accompanying drawing, wherein:

FIGURE 1 is a circuit diagram showing an example of the means for translating input frequency to mixed-base code;

FIGURES 2(*a*), (*b*) and (*c*) show the polar coordinate displays of various signals on the face of a CRT;

FIGURES 3(*a*), (*b*) and (*c*) illustrate the manner in which a particular mixed-base code is implemented on the faces of a plurality of CRT's corresponding in number to the number of positions in the code;

Figures 1, 2, 3:
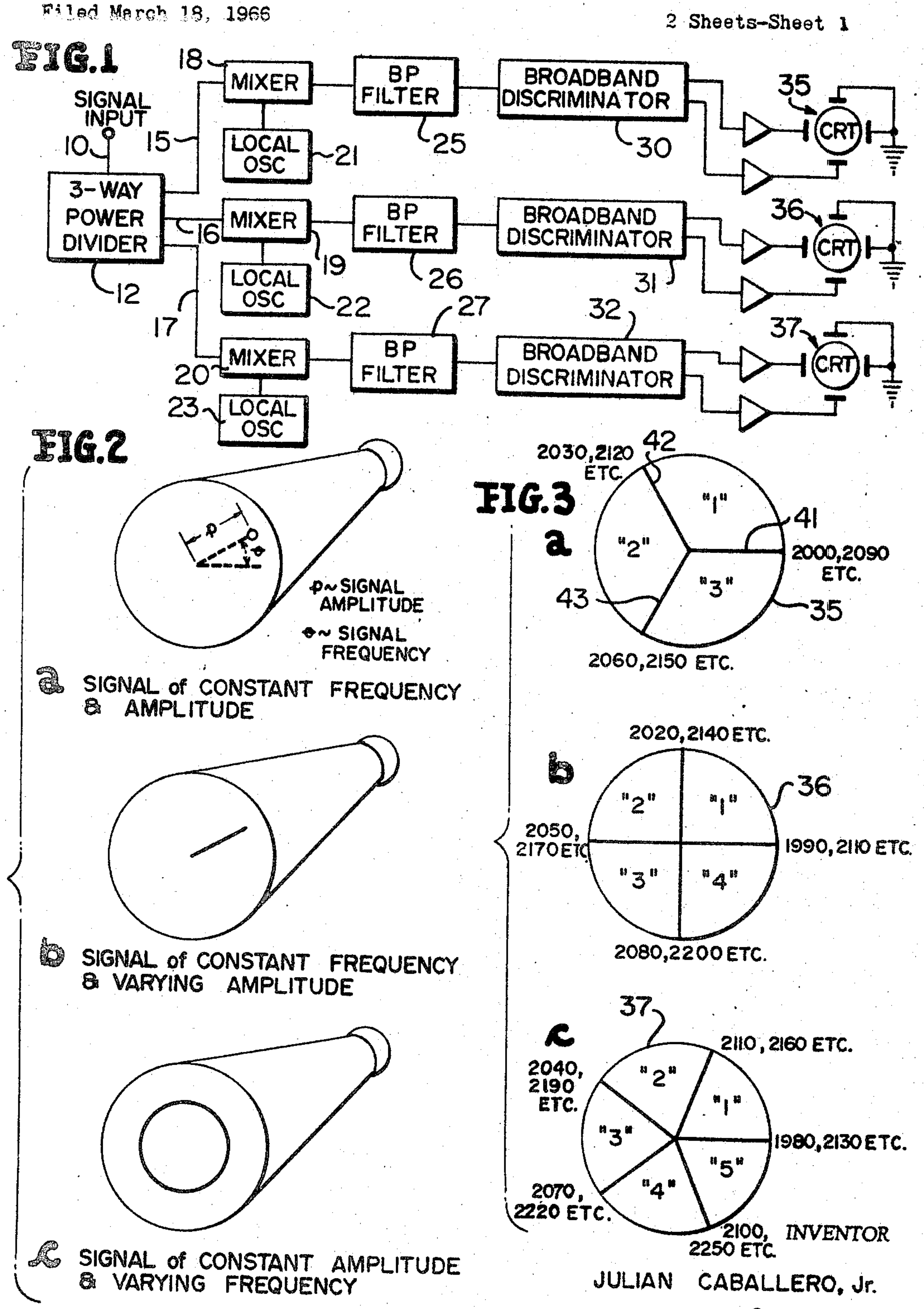

Proceeding now to a description of a preferred embodiment of the invention, and referring initially to FIGURE 1 where is shown a simplified functional block diagram of a circuit for translating input frequency to mixed-base code, each received signal is applied as an input to a power divider 12 by which the signal is split into identical signals corresponding in number to the number of channels required in the receiver. For a tri-modulo code (mixed-base code having three columns or positions, and thus three bases), such as the 3–4–5 mixed-base code, a three-way power divider is employed. Power divider 12 may be of conventional type, being utilized merely to apply the received signal from transmission path 10 to each of paths 15, 16 and 17 for the respective three channels of interest.

Thus, identical signals are fed to mixers 18, 19, 20, each associated with a separate channel or transmission path. The second input applied to each mixer is obtained from a local oscillator (21, 22, 23, respectively) which is simply a harmonic generator producing harmonics spaced at exactly the bandwidth of an associated bandpass filter (25, 26, 27, respectively) to which the respective mixer output is fed.

As previously mentioned, the passband of each of filters 25, 26, and 27 is selected in accordance with the distance to be traveled by the electron beam spot on the face of the CRT along a predetermined circular path in order to insure that the frequency indicated by the readout is invariant for the same input signal frequency. That is, the heterodyning of the input signal with the harmonics supplied by the local oscillator (harmonic generator) is effective to produce a signal lying within the selected passband of the respective bandpass filter and thereby to cause the CRT beam to travel a distance along a circular path proportional to the input signal frequency, as will presently be explained in greater detail. The mixing of input signal and harmonics and the subsequent filtering may be achieved prior to power division if the same circular path is to be traveled by the electron beam for each CRT.

The filtered signals are fed respectively to the three broadband discriminators 30, 31, 32, each associated with a separate channel. The discriminator outputs are amplified and applied to the beam deflection elements of respective electron beam visual display units 35, 36, and 37, here denoted as cathode-ray tubes with associated vertical and horizontal deflection plates. The discriminators and cathode-ray tubes are utilized, in accordance with the present invention, as geometrical filters by which to cleanly divide a preselected wide frequency band into a plurality of narrow R–F cells or channels. To this end, the discriminators, which will be presently described in detail, effectively operate as different lengths of transmission line since phase shift through such lines is proportional to frequency. The cathode-ray tubes produce a polar coordinate display wherein radius is proportional to input signal amplitude and deflection angle (relative to the preselected reference line at 0°, 360°, 720°, etc.) is proportional to input signal frequency.

This type of display is illustrated in FIGURES 2(*a*), 2(*b*), and 2(*c*), each showing the face of a CRT for three distinct possibilities of signal amplitude-signal frequency combinations. In FIGURE 2(*a*)the distance between the beam on the coated surface of the tube and the origin is a radial line having a length $\rho$ proportional to signal amplitude and displaced by an angle $\theta$ from the horizontal line constituting the 0° axis in the polar coordinate system, $\theta$ being proportional to signal frequency. Hence, for CRT signal inputs having both constant frequency and constant amplitude, $\theta$ and $\rho$ are also invariant. In the case of CRT signal inputs of constant amplitude frequency and varying amplitude, depicted by FIGURE 2(*b*), the spot moves back and forth along a radial line maintained at a fixed deflection angle relative to the reference axis. Input signals of constant and varying frequency produce beam deflection describing a circular path as shown in FIGURE 2(*c*).

Thus, if the frequency of a constant-amplitude input signal is varied continuously in one direction, the electron beam describes a circle on the face of the CRT, the beam spot traversing 360° along the circular path as the signal frequency undergoes a change $\Delta f$ depending upon the phase shift (length of transmission line) in the respective discriminator. If the relative phase shifts (relative line lengths) differ for each of the three discriminators 30, 31, and 32 then input signal of constantly increasing or constantly decreasing frequency applied in parallel (i.e., a simultaneously) to the discriminators will result in beam-generated circles on the three displays (CRT's 35, 36, and 37), each beam completing a full revolution for a different value of fraquency change $\Delta f$.

Digressing slightly for the moment, it is convenient at this point to mention a variation of the simple mixed base code discussed earlier. It has been noted that for a 3–4–5 code the first digit may assume the values 1 through 3, the second digit 1 through 4, and the third digit 1 through 5. By utilizing the mixed-base code, it is possible to significantly reduce the number of filters required to achieve a desired level of channelization, so that a high degree of frequency resolution may be obtained with a small package of reduced complexity. Rather than employing a separate receiver or filter for each channel (narrow frequency band) under observation, each producing a separate output from which to detect the frequency of a received signal, the frequency information from the mixed-base receiver is produced as a trimodulo (i.e., 3-digit, mixed-base code format requiring considerably fewer actual receiver channels. It is to be emphasized again that the 3–4–5 mixed-base code does not have sufficient permutations to fully realize the advantages of systems according to the invention, but it is useful in simplifying the explanation.

The simple 3–4–5 code may be used to provide 60 non-redundant permutations and thus to code 60 independent contiguous channels with only 12 (3+4+5) signal output leads. However, it is also subject to rather large frequency errors should the input signal fall between two filters, in that a change in one digit of the code may produce an erroneous indication that the received signal has a frequency lying within a band displaced several channels from its actual channel location. For example, the code word "141" in 3–4–5 mixed-base notation, representative of channel 15, becomes, for an increase of "unity" in the third digit (i.e. "142"), a code word denoting channel 51. For this reason it is desirable to sacrifice a few of the total number of channels available using the simple mixed-base code, in favor of the large-error-avoiding capability of a staggered mixed-base code. An example of a suitable staggered 3–4–5 mixed base code is shown in part in Table B, below, for the first several channels in an S-band coded to provide 10-megacycle accuracy:

TABLE B

| | Base frequency, mc. | 3-4-5 Staggered Mixed-base code | | |
|---|---|---|---|---|
| | | 1st Digit | 2nd Digit | 3rd Digit |
| Channel: | | | | |
| 1 | 2,000 | 1 | 1 | 1 |
| 2 | 2,010 | 1 | 1 | 2 |
| 3 | 2,020 | 1 | 1 | 2 |
| 4 | 2,030 | 2 | 2 | 2 |
| 5 | 2,040 | 2 | 2 | 3 |
| 6 | 2,050 | 2 | 3 | 3 |
| 7 | 2,060 | 3 | 3 | 3 |
| 8 | 2,070 | 3 | 3 | 4 |
| 9 | 2,080 | 3 | 4 | 4 |
| 10 | 2,090 | 1 | 4 | 4 |
| 11 | 2,100 | 1 | 4 | 5 |
| 12 | 2,110 | 1 | 1 | 5 |
| 13 | 2,120 | 2 | 1 | 5 |
| 14 | 2,130 | 2 | 1 | 1 |
| 15 | 2,140 | 2 | 2 | 1 |
| 16 | 2,150 | 3 | 2 | 1 |
| 17 | 2,160 | 3 | 2 | 2 |
| 18 | 2,170 | 3 | 3 | 2 |

It can be shown that a staggered 3–4–5 mixed-base code of the above type provides 48 non-redundant permutations, so that 48 channels may thereby be coded. It will be noted from a consideration of Table B that the individual digits change value only once every 30 mc. Hence, the first digit of the code repeats itself every 90 mc. (i.e., 3×30 mc.), and the third digit every 150 mc. (i.e., 5×30 mc.). A change of "unity" in any digit, either up or down, thereby results merely in the generation of the code of an adjacent channel, obviating the potential large frequency error if the simple mixed-base code were used.

By providing an output lead for each value which can be assumed by a digit in each of three positions or columns of the staggered mixed base code, the first digit of the code can produce an output on one of three output leads, the second digit will energize one of four other output leads, and the third digit provides an output on one of the five remaining output leads, a total of only twelve output leads being required to encode the 48 available channels. As will presently be described, the mixed-base receiver may be implemented with each output lead requiring only a single filter, so that 48 channels may be provided with only 12 filters. By using larger mixed-base codes, the reduction in number of components over that required in conventional receiver systems is even more striking; for example, a 1,000-channel receiver has been developed using only 52 filters, utilizing the principles of the present invention.

Returning now to the previous discussion of a constant amplitude input signal of constantly changing frequency fed simultaneously to discriminators 30, 31, and 32 (FIGURE 1), assume, for an exemplary receiver operating at 2 gc., that the transmission line lengths in the three discriminators are chosen such that the beam spot on the first display (CRT 35) completes one circular revolution every 90 mc., the second beam spot (for CRT 36) one revolution every 120 mc., and the third beam spot (for CRT 37) one revolution every 150 mc. It will be observed that these three frequency intervals are identical to the three frequency intervals required for a complete cycle of each of the three respective digits of the 3–4–5 staggered mixed-base code of Table B. By dividing the first display into three equal wedge-shaped segments with one dividing line at $f$=2000 mc., the second display into four equal segments with one dividing line at $f$=1990 mc., and the third display into five equal segments with one dividing line at $f$=1980 mc., it will further be observed that the wedge-shaped segments represent frequency bands and that if a readout is available which denotes incidence of the electron beam on a particular segment, bandpass filters will have been physically implemented by the geometrical shapes on the respective faces of the cathode-ray tubes. Such an arrangement is shown in FIGURES 3(*a*), (*b*), and (*c*) for CRT's 35, 36, and 37, respectively.

Since the electron beam makes multiple revolutions as frequency is constantly increased, each segment on each CRT face represents a plurality of bandpass filters. Referring to FIGURE 3(*a*), for example, the dividing lines 41, 42 and 43 on the face of CRT 35 radiate from the origin (i.e., are radial lines emanating from the center, or non-deflected beam position, of the tube), adjacent lines subtending an angle of 120° and each line designating frequencies spaced at increments of 90 megacycles and separated from adjacent lines by increments of 30 mc. Thus, each bandpass filter is 30 mc. wide with center frequencies of successive passbands for the same segment being separated by 90 mc. Similar considerations apply for the geometrical bandpass filters defined by the segments on the faces of CRT's 36 and 37 in FIGURES 3(*b*) and 3(*c*), respectively. Thus, for the 4-segment CRT 36, center frequency separations of successive passbands for the same segment are 120 mc., and for 5-segment CRT 37 are 150 mc. It is to be noted that the passbands do not vary as a function of signal amplitude as in conventional filters, and that the band edges are extremely sharp.

With each dividing line on each CRT face designating frequencies as shown in FIGURES 3(*a*), (*b*) and (*c*), and segments of each CRT equated with the values (counting in a counterclockwise direction for the segments) which may be assumed by the respective digits in the three positions of the 3–4–5 mixed-base code, the sequence of code words generated as input signal frequency increases from 2000 mc. corresponds to those illustrated in Table B. Hence, using the configuration shown in FIGURES 3(*a*), (*b*), (*c*), forty-eight 10-mc.-wide channels may be obtained with only twelve 30-mc.-wide filters.

Figure 4:
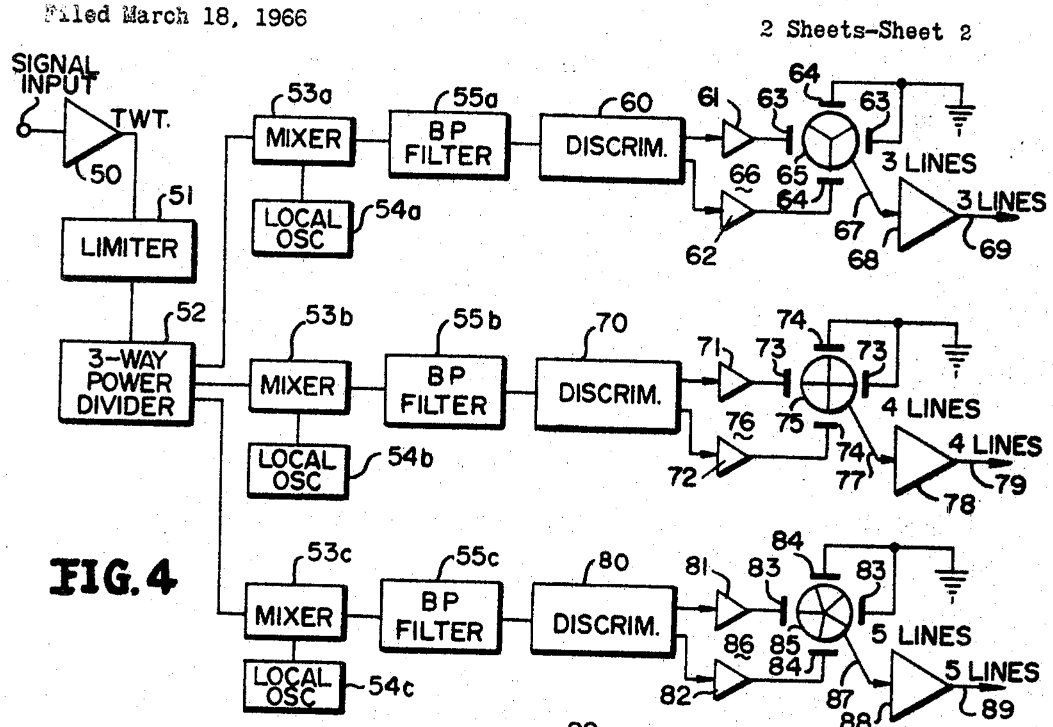
FIGURE 4 is a circuit diagram of a receiver according to the invention.

Referring now to FIGURE 4, a complete receiver according to the present invention may, for example, comprise traveling wave tube amplifier (TWT) 50, limiter 51, 3-way power divider 52, and three distinct filter means, generally designated 66, 76, and 86, for selectively detecting and classifying signals received within any of the forty-eight 10-mc.-wide contiguous channels to be monitored. It must again be emphasized that the number of power divisions and filter means and the configuration of each filter means is dependent upon the number of bases employed in the mixed-base code and the makeup of the code. The circuit diagram of FIGURE 4 is generally representative of a receiver wherein a trimodulo, and specifically a 3–4–5 staggered mixed-base coding scheme is employed; however, those skilled in the art to which the invention pertains will immediately recognize the applicability of the principles disclosed herein to other larger capacity coding schemes.

It will be assumed for the sake of illustration that the receiver is operative within a range of frequencies from 2- to 4-gc. (gigacycles, or kilomegacycles), a typical frequency range for airborne or ground applications, and that a relatively low sensitivity requirement of approximately −45 to −50 dbm is specified. Increased sensitivity may, if desired, be achieved by well-known techniques of receiver design for those applications requiring greater detection capability. However, it will be noted that systems contemplated by the present invention are inherently wide-band, and, other things being equal, cannot achieve the sensitivities of narrow-band devices.

The −50 dbm sensitivity requirement for this example is normally achievable with a crystal video receiver; however, the losses experienced in the broadband discriminator make R-F preamplification desirable. A suitable component for providing preamplification is the TWT amplifier 50, chosen because of the relatively wire R-F bandwidth involved. To attain the desired objective several factors are to be considered, e.g., the TWT should have a sufficiently low noise figure and a sufficiently high gain to meet the overall system sensitivity requirement (here assumed to be −50 dbm); the rated output power of the TWT should be sufficiently high to produce a moderate dynamic range; and, if the application is airborne instrumentation, the TWT should be small, lightweight, and rugged. A suitable commercially available TWT amplifier is the STS–284, manufactured by the Tube Division of Sperry Rand, which provides 1-watt CW power output over the 2- to 4-gc. range, a noise figure of 35 db maximum, a small signal gain of 53 db, and a gain at rated power of 40 db. The tube is 14 inches long, weighs 8 pounds, and is PPM focused.

System sensitivity using the STS–284 is calculated as follows: the sensitivity, S, of a crystal video receiver preceded by an R-F amplifier for unity signal-to-noise ratio is given by $$S\text{ dbm}=-114\text{ dbm}+F\text{ db}+10\log_{10}(2B_1B_v)^{1/2}$$

provided the R-F bandwidth is at least 10 times the video bandwidth and the gain, G, of the R-F amplifier satisfies the condition $$G\geq|S-S_x|+3\text{ db}$$

where F is the noise figure of the R-F amplifier, $B_r$ is the R-F bandwidth in mc., $B_v$ is the video bandwidth in mc., and $S_x$ is the sensitivity of the crystal. In the example under consideration, $B_r$ is 2000 mc., $B_v$ is 10 mc., F is 35 db, and $S_x$ is approximately −53 dbm for a Microwave Associates 408A video diode. Substituting these specific values in the above expressions, gives $$S\text{ dbm}=114\text{ dbm}+35\text{ db}+10\log_{10}(2\times2000\times10)^{1/2}$$
$$=-114+35+23$$
$$S\text{ dbm}=-56\text{ dbm}$$

and $$G\geq|-56+53|+3$$
$$G\geq6\text{ db}$$

For the previously stated TWT gain of 53 db, and losses through the discriminators of approximately 20 db, the net gain is about 33 db, which is more than sufficient for the exemplary requirements set forth.

As will presently be explained in greater detail, the RCT's can accept a dynamic range of approximately 11 db. To ensure that this range is not exceeded, a limiter 51 is employed after TWT amplifier 50. The initially assumed −50 dbm input signal will produce a +3 dbm signal output from the TWT amplifier, using the aforementioned tube, so that the limiting level should be approximately +14 dbm. To this end, a varactor limiter, such as the Microwave Associates 8444–S5N, which operates over the 2- to 4-gc. range and limits between +10 and +15 dbm, may be used as limiter 51. This particular limiter can handle a peak power of 40 watts and an average of 2 watts; hence, it is adequately protected when employed behind the STS–284 TWT amplifier. Recovery time is 50 nanoseconds maximum, so that strong signal blockage does not occur for any appreciable length of time. If necessary, some flexibility in adjusting dynamic range can be achieved by inserting attenuation between TWT amplifier 50 and limiter 51.

The output of limiter 51 is applied to 3-way R-F power divider 52, a conventional unit which is operative to produce identical signals at each of its several output terminals. The three outputs of divider 52 are fed in parallel to filter means 66, 76, and 86, each of which includes a mixer, a local oscillator, a bandpass filter, a broadband discriminator and a visual display (CRT) of the types described above in connection with the discussion of FIGURES 1–3. Since the components and cooperative interrelationship of components of the three filter means 66, 76, and 86 are quite similar in nature and extent, the following description of the remaining circuitry of FIGURE 4 will be limited to a single filter means, with appropriate references being made to the others only in those cases where differences exist in otherwise corresponding components.

Referring for example to filter means 86, one output of R-F power divider 52 is applied to mixer 53c, to which is also applied the signal generated by local oscillator 54c. Since the output of the local oscillator consists of harmonics spaced at exactly the bandwidth of bandpass filter 55c, to which the output of the mixer is fed, it follows that the sum or difference of the input signal frequency and the frequency of one of the harmonics will lie within the passband of filter 55c. This passband is preselected in accordance with the band of frequencies at which the remaining portion of the respective filter means is to operate, depending upon the length of the circular path to be traveled by the eletcron beam "spot" on the face of the CRT for a particular frequency. The mixer, local oscillator and bandpass filter may, if desired, be deleted from the circuit, and the output of the power divider fed directly to the respective broadband discriminator, in which case the spot on the display follows a different circular path for each revolution, in a spiral fashion.

Figure 5:
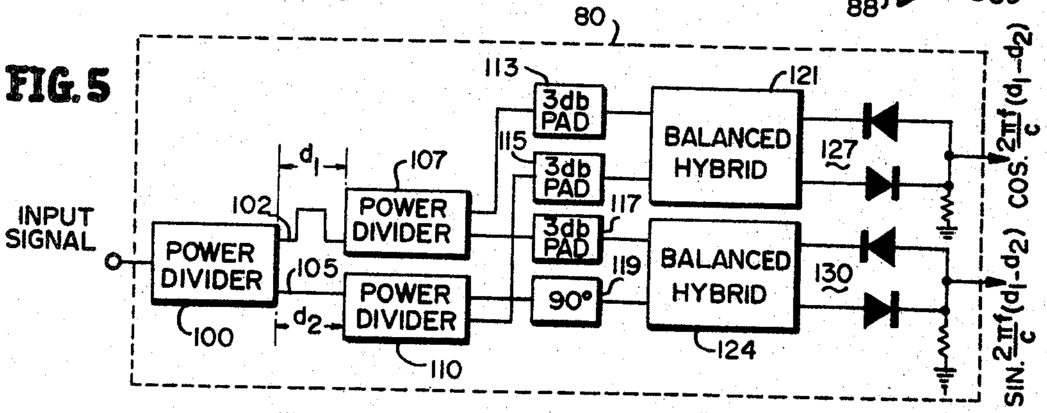
FIGURE 5 is a circuit diagram of an exemplary discriminator for the receiver of FIGURE 4.

An illustrative embodiment of the broadband discriminator (e.g., 80) is shown in FIGURE 5. The input signal to the discriminator is initially split into two identical signals by power divider 100 for application to respective transmission lines 102 and 105 of unequal lengths $d_1$ and $d_2$, respectively. For a linear phase shift line, the total phase shift through transmission line 102 is $2nd_1/\lambda$ and the total phase shift through the line 105 is $2nd_2/\lambda$, where $\lambda$ is the wavelength of the input signal. The phase difference, $\Delta\theta$, at the outputs of the two lines is therefore $$\Delta\theta=\frac{2nd_1}{\lambda}-\frac{2nd_2}{\lambda}$$

$$\Delta\theta=\frac{2n}{\lambda}(d_1-d_2)$$

However, $$\lambda=c/f$$

where $\lambda$ is wavelength in meters, $f$ is frequency in c.p.s., and $c$ is the velocity of electromagnetic waves in free space, so that $$\Delta\theta\alpha\frac{2f}{c}(d_1-d_2)$$

It will readily be observed that the phase difference between transmission lines 102 and 105 is a function of frequency, and that if the outputs of the two lines are fed to a phase detector, a bipolar voltage proportional to $$\cos\frac{2\pi f}{c}(d_1-d_2)$$

will be obtained. A suitable detector for such purpose may comprise a conventional balanced hybrid 121, to which one output of each of a pair of power dividers 107 and 110 coupled respectively to lines 102 and 105 is applied via 3 db pads 113 and 115, and the outputs of which are applied to diode detector 127 to obtain the bipolar voltage proportional to $$\cos\frac{2\pi f}{c}(d_1-d_2)$$

By using two phase detectors and placing a 90° phase shifter in series with one arm of one of them, quadrature output voltages are obtained. Thus, the other output of each of power dividers 107 and 110 is applied to a second balanced hybrid 124, via 3 db pad 117 and 90° phase shifter 119, respectively, and the quadrature output voltage proportional to $$\sin\frac{2\pi f}{c}(d_1-d_2)$$

is taken from diode detector or rectifier 130.

The phase quadrature output voltages emanating from discriminator 80 are applied, via amplifiers 81 and 82 (for filter means 86, FIGURE 4), to respective input plates of horizontal and vertical deflection plates 83 and 84 of CRT 85, producing a circular electron beam pattern on the face of the CRT as the phase is varied 360°. It will be apparent that the number of times the relative phase varies through 360° as the frequency is swept over the receiver bandwidth depends on the difference in line lengths $(d_1-d_2)$ of the discriminator. It will further be apparent from the preceding discussion regarding beam revolution for a different value of frequency change $\Delta f$ in input signal for each CRT, that the three discriminators 60, 70, and 80 differ only in transmission line lengths necessary to achieve the desired beam revolution per $\Delta f$ for their respective associated CRT's.

The discriminators may be constructed entirely of conventional components, and strip-transmission-line components may be used wherever convenient, as in modular arrangements. Amplification of the detected outputs from the discriminators may be accomplished by employing video amplifiers (such as units 81 and 82 in filter means 86) ahead of the respective inputs of the associated CRT's. Since limiting is performed in advance of signal application to the discriminators, the video amplifiers can be linear and need have only a very limited dynamic range.

Figure 6:
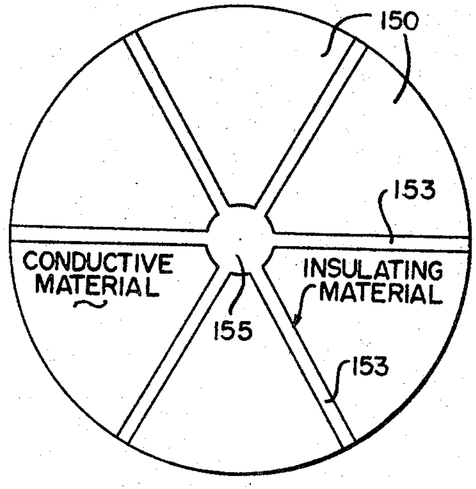
FIGURE 6 is a detailed showing of a multi-segment CRT face.

Each CRT employed in the mixed-base receiver may simply be a modification of an existing conventional cathode-ray tube. Thus, as shown in FIGURE 6, an exemplary six-segment CRT pattern or screen may be obtained by modifying a conventional CRT to include wedge-shaped conducting segments 150 and insulating dividing strips 153 on the inside of the glass face plate rather than the usual phosphor coating. The insulating strips 153 follow radial lines, displaced at equal angles from one another, emanating from the center of the tube face about which a circular pattern 155 of insulating material is disposed. The number of conducting segments and thus the number of insulating strips will, of course, depend upon the base in the position or column of the mixed-base code with which the CRT under consideration is associated. For the 3–4–5 coded receiver of FIGURE 4, CRT's 65, 75 and 85 are respectively coated with 3, 4, and 5 wedge-shaped conducting segments on the interior of the tube faces, as previously discussed in connection with FIGURES 3(*a*), (*b*) and (*c*).

Insulating circle 155 may be approximately ¼ inch in diameter since an undeflected beam on a shielded tube can be expected to fall within a circle of such diameter. Insulating strips 153 should be thin, preferably of widths less than the electron beam diameter so that the beam cannot fall entirely within the edges of any strip. In the relatively unlikely event, therefore, that the received signal produces an electron beam deflection at the boundary (i.e., the insulative strip) between two adjacent conductive segments on any CRT face, a readout is obtained from both segments, and procedure in such an event will be explained presently. For a typical CRT, an accelerating anode voltage of about 800 volts will produce a beam diameter of from 8 to 12 mils. It will be understood, of course, that the conductive and insulative coatings on the inner face of the CRT are to be applied during tube manufacture.

The dynamic range of each display is determined by the maximum and minimum beam deflections. For a 2-inch tube, for example, maximum deflection should be slightly less than one inch, the radius of the tube. Minimum deflection should in all cases be large enough to insure that the electron beam moves outside the center circle of insulating material; thus, a minimum beam deflection of ¼ inch is sufficient, in the above example of ¼-inch diameter for insulating circle 155, to insure that the beam is deflected onto a conductive segment even if its undeflected position should lie adjacent the boundary of the insulating circle, i.e. off-center of the circular tube face. Since beam deflection is proportional to voltage applied to the CRT deflection plates, the ratio of maximum to minimum deflection is equivalent to the dynamic range that can be accepted by the CRT, approximately 11 db in the receiver embodiment of FIGURE 4.

A separate conductive lead is connected to each conductive segment on the internal face of the cathode-ray tube, each lead exiting the tube, for example, from a hermetically sealed junction.

When a signal lying within the frequency band to be monitored is received, a readout current appears on one of each of the several leads represented by lines 67, 77, and 87 (FIGURE 4) owing to the electron beam associated with each CRT impinging on a conductive segment of the respective tube. Line 67, for example, represents three separate leads or lines each conductively connected to a separate respective one of the conducting segments of the tube 65, and, similarly, lines 77 and 87 represent four and five lead groups, respectively, connected to separate segments of respective CRT's 75 and 85. The current pulse thus appearing on a lead of each set (67, 77, and 87) is amplified by a video amplifier (68, 78, and 88, respectively) to bring it to a level sufficient to drive conventional logic circuits (not shown) by which the frequency of the received signal is displayed in accordance with the staggered mixer-base code of Table B, above.

As previously stated, an input signal which causes the electron beam of one of the CRT's to impinge on the boundary between two adjacent segments will result in a readout from both segments, i.e. a current pulse on both leads connected to those segments and a subsequent indication from the associated driven logic circuits. Hence, two different code notations or indications within the mixed-base code are presented, each having two digits identical to the other, with a third digit differing by one (e.g., 131 and 132). It will be observed from a consideration of Table B, that in all such cases the two code indications must represent adjacent channels. In the exemplary embodiment disclosed herein the effect on system operation is merely that the two adjacent channels from which simultaneous readouts are obtained are effectively combined into one 20-megacycle-wide channel, which may be monitored in the same manner as the standard 10-mc. channels.

The primary advantage of employing cathode-ray tube, or beam deflection, readout devices in preference to other configurations is that the phase indication is not affected by amplitude variations. However, it will be apparent from a consideration of the inventive concepts and principles disclosed herein that other techniques providing equivalent performance may be employed, and that in some applications minor amplitude sensitivity may not be significant, in which case straightforward quantization may be adquate. Moreover, in some cases it may be desired to utilize the conventional phosphor coating on the internal surface of each CRT face, subdivided externally into the desired segments with appropriate code indicia, and simply to observe the position of beam spot on each of the several tube faces.

It should also be noted that a very accurate direction-finding system may be constructed in accordance with the principles of the present invention. A multi-baseline phase interferometer direction-finding array may, for example, be substituted for the transmission line discriminators previously desicribed to produce digital code outputs proportional to the angle of arrival of incoming signal. The codes in such an arrangement will be function of both frequency and angle, but frequency may be accurately obtained using the previously described discriminator system so that a suitable data processor can compensate for frequency-induced variations.

As was discussed earlier, the 3–4–5 mixed-base code has been used for purposes of illustration; in many applications that particular code will not have sufficient capacity. Hence, larger base codes or codes employing an increased number of bases (in the mixed-base format, of course) are often required; but the implementation of suitable apparatus in such cases is simply an obvious extension of the teachings set forth herein, although selection of the optimum code for a particular application may involve a relatively complex calculation because not all permutations aret free of ambiguity.

I claim:

1. A wideband high-resolution receiver for concurrently monitoring a plurality of contiguous frequency channels in a preselected band of the R-F spectrum and for detecting and indicating the presence of a signal within any of said channels by conversion of the signal to a digital mixed-base code notation representative of the channel carrying said signal, said receiver comprising a plurality of parallel transmission paths equal in number to the number of digital positions in said code; each of said paths including means responsive to signal applied thereto for shifting the phase of the last-named signal by an amount proportional to the frequency thereof and differing from the amount of phase shift introduced by the phase shifting means of all of the other paths by respective predetermined increments of relative phase, and analog-to-digital converter means responsive to the phase shifted signal for correlating the amount of phase shift to a digital value within the set of possible digital values governed by the base for the mixed-base code position with which the respective path is associated, so that the instantaneous totality of correlated digital values for all of the transmission paths denotes the mixed-base code notation representative of the frequency-dependent incremental phase shifts of applied signal and thereby of a frequency range corresponding to at least one of said channels; and means for applying received signal within said preselected band to said plurality of parallel transmission paths.

2. The combination according to claim 1 wherein said means for applying includes means for confining the signal applied to said plurality of transmission paths to a predetermined frequency band, the last-named means including a filter having a passband equal to said predetermined frequency band and narrower than said preselected band, means for generating harmonics spaced at the passband of said filter, and means for mixing said received signal and said harmonics to supply signal to said filter.

3. The combination according to claim 1 wherein said analog-to-digital converter means comprises a cathode-ray tube having a plurality of wedge-shaped conductive segments on the internal face thereof, the number of conductive segments corresponding to the number of digital values within said set, said segments separated by insulative strips directed along radial paths from the center of the tube face, adjacent strips defining an angle, and thereby a segment, therebetween representative of successive ones of said channels separated from each other by the freouency range covered by channels of which the remaining segments are representative, and a separate conductive lead connected to each segment, whereby a voltage is derived on the lead associated with a segment on which the electron beam of the tube is incident.

4. The combination according to claim 3 wherein each insulative strip has a width less than the diameter of the electron beam so that deflection of the beam results in incidence of the beam on at least one of said segments, and wherein an insulative circular portion is disposed at the juncture of said insulative strips at the center of the face of the tube to inhibit a voltage output on any of said leads while said electron beam is in the normal undeflected position on the tube face.

5. The combination according to claim 4 wherein said phase shifting means comprises a pair of parallel transmission lines of different length, means for feeding signal applied to the respective transmission path to said pair of transmission lines whereby the output voltages of the two lines are relatively displaced in phase as a function of transmission line length, and thereby of signal frequency, and means responsive to the phase displaced output voltages of the lines for generating a pair of quadrature voltages each proportional to said phase displacement; and means applying said quadrature voltages to the horizontal and vertical beam deflection apparatus, respectively, of said cathode-ray tube to deflect said beam through an angle, relative to one of said strips as a reference, dependent upon the difference in length of said transmission lines and thereby upon signal frequency, and by a radial amount dependent upon signal amplitude.

6. The combination according to claim 5 wherein the amplitudes of said quadrature voltages are confined to a range equivalent to allowable maximum-to-minimum radial deflection of the beam to insure incidence of the deflected beam on at least one of said conductive segments.

7. The combination according to claim 6 wherein said means for applying received signal to said plurality of parallel transmission paths includes a power divider adapted to divide said signal into a number of identical R-F signals corresponding to the number of parallel transmission paths.

8. The combination according to claim 7 wherein said means for applying received signal further includes means for limiting the power of the received signal to a range commensurate with the quadrature voltage range.

9. Apparatus for concurrently monitoring $m$ frequency channels contiguous over a preselected band of the R-F spectrum, comprising $n$ geometrical filter means, where $n$ corresponds to the number of positions of a preselected digital mixed-base code, for dividing said preselected band into said $m$ frequency channels, where $n$ is less than $m$, each geometrical filter means corresponding to a position of said code and each having a plurality of readout divisions representing the set of digital values capable of being assumed by that position in accordance with the base corresponding to that position, so that each division of any one of said geometrical filter means is representative of a digit associated with one or more of said frequency channels, the divisions of each of said geometrical filter means being associated with identical frequency bandwidths displaced in frequency range by the bandwidth of each of said frequency channels relative to divisions of the other of said filter means so that the readout of a division of one of said filter means is redundant as to which of the frequency channels carries an input signal lying within said band, while the readout of a separate division of all of said $n$ geometrical filter means constitutes a non-redundant indication of the frequency channel carrying said signal; and means for applying input signal lying within said R-F band in parallel to each of said filter means.

10. Apparatus for translating analog signal frequency to a digital mixed-base code representative of a frequency channel within which said analog signal frequency lies, comprising a plurality of filters each associated with a digital position of said code, said filters each including means for dividing a relatively wide band of the R-F spectrum into a plurality of narrow contiguous frequency bands each wider than the bandwidth of said frequency channel, each of said narrow frequency bands overlapping a portion of frequency band provided by the means for dividing of the other filters by an amount corresponding to the bandwidth of said channel, the means for dividing of each filter corresponding to the set of digital values capable of being assumed by the respective code position in accordance with the base for that position, so that signal appearing in a frequency band provided by the means for dividing of any filter is associated with a distinct digit of the code position with which that filter is associated, whereby analog input signal applied at any given instant in parallel to all of said filters is confined to a common overlapping portion of the narrow frequency bands thereof corresponding to a distinct frequency channel designated by a distinct mixed-base code notation.

11. The combination according to claim 10 wherein each of said filters comprises a cathode-ray tube having an internal face segmented into identical conductive wedges separated by radial insulative strips, each of said segments defining successive ones of said narrow frequency bands spaced by the bandwidth of all of the narrow frequency bands defined by the remaining segments, each of said segments corresponding to a distinct one of said set of digital values, whereby incidence of the electron beam of said tube on a segment produces a voltage on said segment representative of a distinct digit of said code indicative of any one of said successive narrow frequency bands, and, in combination with the voltages accompanying incidence of the electron beams on segments of the tubes associated with the others of said filters, represents a code notation designating a distinct frequency channel.

12. The combination according to claim 11 wherein each of said filters further includes a broadband discriminator corresponding to a portion of the respective means for dividing of which the segments of the respective cathode-ray tube correspond to the remaining portion, said broadband discriminator including a pair of transmission lines of different length for producing a phase difference as a function of frequency of a signal commonly applied thereto, and means for detecting said phase difference and for generating quadrature voltages representative thereof for respective application to the horizontal and vertical deflection plates of said cathode-ray tube.

13. A wideband receiver for detecting signal within any of a plurality of contiguous channels of an R-F band, the bandwidth of each of said channels being preselected to specify the number of digital positions of a mixed base code utilized to designate the channels, each channel being identified by a distinct and different digital word of said code, said receiver comprising a plurality of beam deflection units, separate and distinct ones of said beam deflection units corresponding to and representative of respective code positions, each of said beam deflection units having a surface against which the respective beam is to impinge, said surface subdivided into a plurality of successive contiguous segments each respectively corresponding to and representative of a separate and distinct digit of the group of digits that may occupy the code position represented by the respective deflection unit, means responsive to signal in said band for concurrently deriving from the frequency thereof beam deflection signals to be applied to respective ones of said beam deflection units to displace the respective beam, by an amount dependent upon signal frequency, onto a segment of the surface of the respective deflection unit, so that the location of each beam on a segment of the respective deflection unit is indicative of a distinct digit for the code position represented by that deflection unit, and the digital word designated by the combination of distinct digits for said plurality of deflection units is indicative of the channel within which the signal in said band lies, and means for simultaneously applying said derived beam deflection signals to respective ones of said deflection units.

References Cited

UNITED STATES PATENTS 3,132,334 5/1964 Williams ---------- 340—347

KATHLEEN H. CLAFFY, Primary Examiner

CHARLES JIRAUCH, Assistant Examiner